United States Patent
Wagner

[11] Patent Number: 6,136,124
[45] Date of Patent: Oct. 24, 2000

[54] PROCESS FOR PRODUCING A STRUCTURED, VOLUMINOUS NONWOVEN

[75] Inventor: Werner Wagner, Bad Nenndorf, Germany

[73] Assignee: HCD Hygienic Composites Development GmbH, Muelheim an der Ruhr, Germany

[21] Appl. No.: 09/091,431

[22] PCT Filed: Dec. 7, 1996

[86] PCT No.: PCT/EP96/05481

§ 371 Date: Dec. 22, 1998

§ 102(e) Date: Dec. 22, 1998

[87] PCT Pub. No.: WO97/22742

PCT Pub. Date: Jun. 26, 1997

[30] Foreign Application Priority Data

Dec. 19, 1995 [DE] Germany .......................... 195 47 319

[51] Int. Cl.[7] .................. D04H 1/54; D04H 3/16
[52] U.S. Cl. .............. 156/167; 156/181; 156/209; 156/229; 264/173.15; 264/210.8; 264/284; 264/290.5; 264/DIG. 73
[58] Field of Search ...................... 156/167, 180, 156/181, 229, 209; 264/173.15, 210.8, 284, 290.5, DIG. 28, DIG. 73; 425/72.2

[56] References Cited

U.S. PATENT DOCUMENTS 4,592,943   6/1986   Cancian et al. .......................... 428/171
4,774,124   9/1988   Shimalla et al. ........................ 428/171

*Primary Examiner*—Sam Chuan Yao
*Attorney, Agent, or Firm*—Milde, Hoffberg & Macklin, LLP

[57] ABSTRACT

A process for producing a structured, voluminous nonwowen comprises the following steps: (a) a spun nonwoven is produced from a plurality of individual filaments which are stretched and gathered into a skein of fibers; (b) the skein is pressed and not-bonded into a crude nonwoven (12) through a first pair of rollers (9a, b); and (c) the crude nonwoven is further processed through a second pair of rollers (10a, b). The process is characterized in that the individual filaments are initially stretched merely up to a range from 50 to 70% of their maximum possible extension, and in that the crude nonwoven (12) is further processed through a pair of rollers (10a, b) composed of a positive roller (10a) with numerous nops or elevations (11) distributed over the outer surface of the roller and of a negative roller (10) with just as numerous recesses or depressions (12). During rolling, the nops engage the recesses and further stretch the crude non-woven in the area of the roller nops.

5 Claims, 1 Drawing Sheet

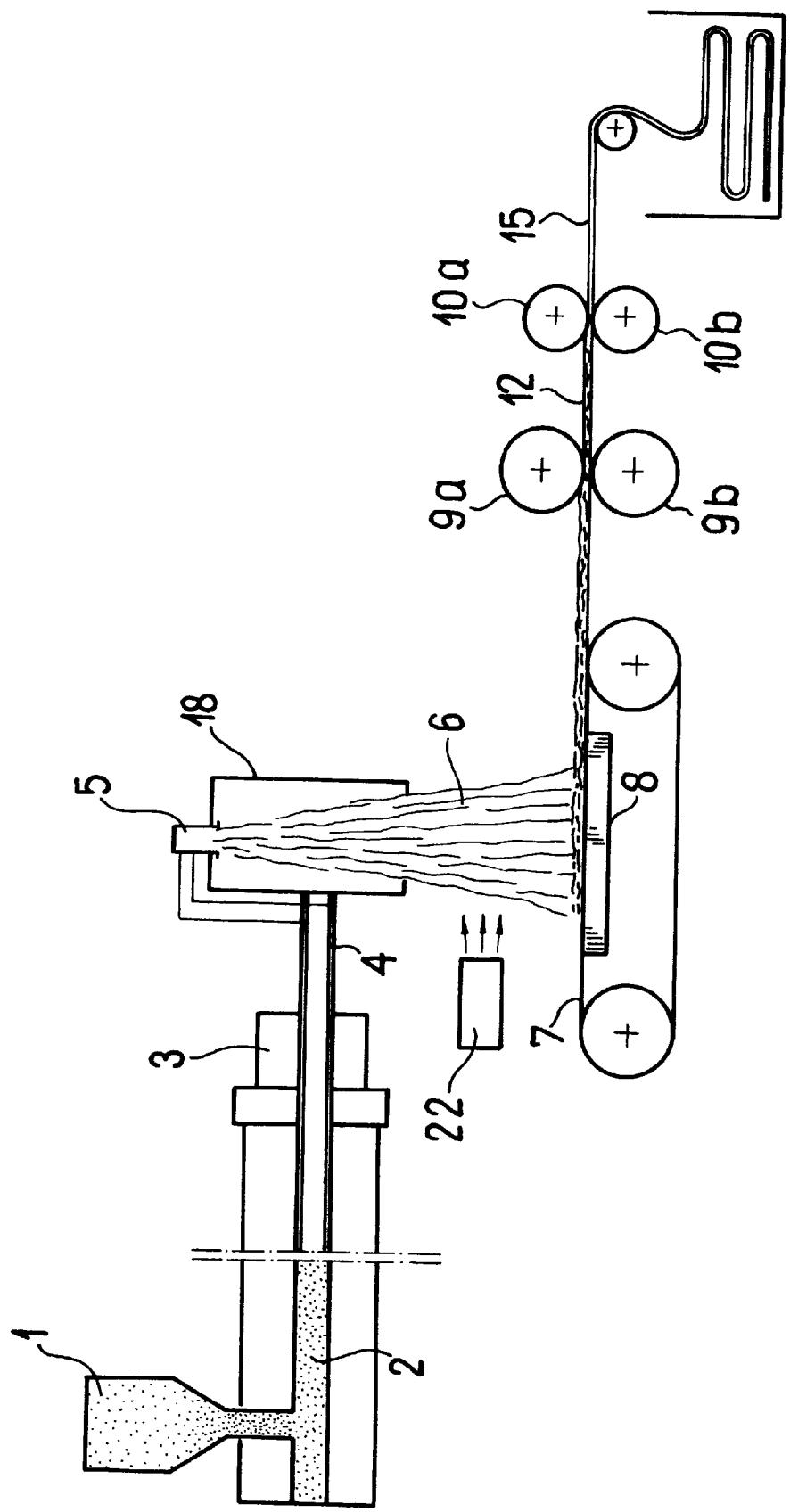

PROCESS FOR PRODUCING A STRUCTURED, VOLUMINOUS NONWOVEN

BACKGROUND OF THE INVENTION

The present invention concerns a method of manufacturing a bulky textured non-woven. The method comprises the steps of:

(a) producing a spin-bonded non-woven from many individual filaments that have been stretched and deposited in the form of a skein of fibers, (b) pressing and hot bonding the skein into a semifinished non-woven between a pair of rollers, and (c) processing the skein with another pair of rollers.

A method of this type is known from U.S. Pat. No. 5,399,174. This patent describes a laminated sheet comprising a non-woven layer of bunches of kinked polymeric fibers bonded to a sheet of polymer. Rollers impress a bonding and decorative pattern that connects the non-woven to the sheet.

The same patent's Background of the Invention mentions that roller impressing is one method of modifying a non-woven's feel while simultaneously producing a decorative pattern. The patent also refers to the U.S. Pat. No. 4,592,943 which relates a method whereby a non-woven is heated while the sheet being processed travels between two gratings that transfer their patterns to the non-woven. Also mentioned is the U.S. Pat. No. 4,774,124 that discloses a patterned-roller impression method.

Common to all these methods is that a bulky layer of non-woven must be initially produced before being impressed with a pattern. The layer of non-woven, however, decreases rather than increases in bulk.

SUMMARY OF THE INVENTION

The principal object of the present invention is accordingly to provide a spin-bonded non-woven that has its already deposited fibers and filaments partly bonded together as a result of the deposition itself with a definite increase in bulk and with "three-dimensionality" by subsequently processing the web of semifinished non-woven in a novel way with the second pair of rollers.

This object is attained, in accordance with the present invention, in the generic method set forth above by initially stretching the separate filaments to a range from 50 to 70% of their maximal possible extension (i.e., just before their breaking point) during step (a) and subsequently processing the semifinished non-woven during step (c) between a pair of rollers comprising a positive roller, specifically a roller with elevations distributed over its surface, and a negative roller, specifically a roller with the same number depressions distributed over its surface such that the elevations in the first roller engage the depressions in the second roller, stretching the non-woven further in the vicinity of the positive/negative roller engagement.

The method in accordance with the present invention results in spin-bonded non-wovens that are essentially better than those manufactured in accordance with the classical method. The fibers in both the semifinished non-wovens and in the final products manufactured by the classical method are deposited essential two-dimensionally. These materials can accordingly be considered paper-like, and their fibers can be oriented three-dimensionally at the state of the art only by expensive and to some extent complicated additional processing.

Obtaining a bulky deposit by using highly kinked fibers (staple fibers) is admittedly known. Still, such materials will not have a cloth-like feel unless further processed. Furthermore, the physical properties of kinked staple fibers can often not be exploited in spin-bonded non-wovens.

Spin-bonded non-wovens are manufactured by extruding a molten polymer, usually polyethylene, polypropylene, or polyamide. The melt is homogenized, filtered, and conveyed to one or more viscose pumps that supplies it to spinnerets at uniform pressure. The melt is forced through the spinnerets at constant pressure and cooled. The separate filaments are uniformly stretched in a separate process and deposited onto a traveling belt. The result is a skein that is essentially two-dimensionally oriented. The skein is conveyed to a pair of rollers, usually comprising a rough and a smooth steel roller, that partly fuse the skein to augment its two-dimensionality. The result is the "semifinished" non-woven.

The method in accordance with the present invention results in a highly stretchable and bulky non-woven. The elevations and depressions can be exploited to create specified patterns. Such patterning is described at the state of the art.

Since the pair of rollers employed to reshape the non-woven comprises mutually engaging positive and negative rollers, the fibers can be stretched and extended between them.

The depth and extent of engagement and the design of the elevations dictate the extent and design of the pattern that reshapes the non-woven. The particular geometry employed can stretch the material far enough to desirably thin the non-woven in the vicinity of the crests of the elevations. The thinness can act as perforations or even be carried out far enough to result in actual perforations.

The reshaping technique considerably stretches the non-woven without, however, the lateral appropriation of material that leads in known methods to shrinkage in width. This feature will be especially evident in a non-woven provided with longitudinal-groove stretching.

In this method, the temperature will preferably be maintained such that the second stretching by the pair of rollers will be carried out essentially with the non-woven at the temperature prevailing during the first stretching. Temperature deviations of as much as ±10%, however, can easily be accommodated.

Both the shape of the elevations and the material that the surface of the roller is make of are very essential to the results of the method.

The elevations and depressions on and in the rollers can for example be metal and have relatively sharp cutting edges. In this event, damage to the material by even relatively low depressions cannot be ruled out that. Relatively low depressions are accordingly desirable.

An interesting discovery is that intended reshaping and stretching effects can be considerably promoted by making the roller with the elevations metal or coated with metal and simultaneously making the elevations as long as possible while making the roller with the depressions plastic or coated with plastic, especially an elastomer. The plastic can for example be hard rubber, silicon caoutchouc, polytetrafluoroethylene, polyurethane, or polyamide.

The plastic-coated surface with elevations obviously constitutes a resilient bed that the metal elevations can engage more deeply than if both surfaces were metal. A combination of metal and plastic surfaces can accordingly be employed to manufacture an extremely fluffy and three-dimensionally oriented non-woven.

The rollers can be produced by the known technique of laser engraving. The depressions can arranged in any desired geometric pattern. They can be webs, circles, grooves, or mutually displaced webs, knobs or punch-like structures. The particular structure depends on the distribution of their effect over the surfaces of the rollers.

It is particularly recommended for the edges of the rollers to be in direct contact in order to prevent the skein being drawn into the depressions without being stretched there.

One embodiment of the present invention will now be specified by way of example with reference to the single figure, a schematic illustration of a device that can be used for the method in accordance with the present invention.

The figure shows a bulky and textured non-woven in the process of being manufactured. Thermoplastic granules, of a polyethylene, polypropylene, or polyamide appropriate for the particular non-woven being manufactured for example, are stored in a silo 1. The granules are transferred to a heated extruder and forwarded by a screw 2' to a die 3. The extrudate is fed through a hose 4 to a spinneret 5. A skein leaves spinneret 5 in the form of extremely fine filaments.

BRIEF DESCRIPTION OF THE DRAWING

The single figure (FIG. 1) is a schematic illustration of a device that can be used for the method in accordance with the present invention.

DESCRIPTION OF THE PREFERRED EMBODIMENT

The separate filaments are not fully stretched in stretcher 18. Only 60 to 70% if polyethylene or polypropylene and 50 to 70% if polyester or polyamide are of advantage. This feature is in contrast to the conventional approach of initially stretching the material as far as possible before breaking in order to conserve it.

Stretched skein 6 is deposited on an open-weave belt 7 that travels over a vacuum-generating box 8 that keeps the skein flat against the belt. The web is then compressed between two calendering rollers 9a and 9b. The result is a semifinished non-woven 12 weighing 20 g/m$^3$ and only a few millimeters thick.

Semifinished non-woven 12 has been only loosely packed by rollers 9a and 9b. Local hot bonding has been employed only slightly, to facilitate handling the material.

Semifinished non-woven 12 is now forwarded to two more rollers 10a and 10b in the form of stretching and shaping rollers. Roller 10a is a positive roller, meaning that it has many elevations distributed over its surface. Roller 10b is a negative roller, meaning that it has just as many depressions distributed over its surface. As the rollers roll the stretched skein between them, the elevations engage the depressions and stretch it in the vicinity of the engagement. The stretching produces a precisely defined local excess stretch in the composite material in that semifinished non-woven 12 is held stationary at its edges, at, that is, the edges of rollers 10a and 10b and cannot be drawn in toward its midline. The non-woven is accordingly locally secured and extremely stretched in each immediate vicinity. The rollers are designed to eliminate the need for lateral security.

The raised portion, the elevations that is, on roller 10a projects into empty space in the countervailing tool, while the flat portion of the stamping tool keeps the that part of the stretchable non-woven in place. The roller and countervailing roller match each other precise.

The surface of roller 10a will usually be provided with a metal coat, meaning that the outer surfaces of the elevations are metal. Roller 1ob on the other hand is coated with a hard rubber or similar elastomer with a Shore A hardness beyond 100.

The non-woven 15 leaving rollers 10a and 10b will, due to being further stretched locally, have been considerably modified both in filament length and in its overall structure. It will now have, because of the particular design of the rollers, a bouclèed or hammer-stroke texture of a three-dimensional nature. Since the individual filaments are very strong where stretched, the bulkiness will be retained. The feel of the overall non-woven will be perceptibly softer, and it will have a different water-transport vector. Moisture will be transported from the surface to the back of the non-woven along the elevated continuous filaments.

The reshaping can be carried out at relatively low temperatures. Tool temperatures essentially the same as those of stretcher 18 will preferably be employed. Such temperatures are approximately between 50 and 75° C.

The method in accordance with the present invention can be employed continuously downstream of spin bonding. It is alternatively possible to produce and separately process the semifinished non-woven. Another non-woven or a sheet can be laminated to the bulked material.

The method in accordance with the present invention can in principle be employed with any plastic, with polyethylene, polypropylene, or polyamide for instance, appropriate for molten spinning and stretching.

There has thus been shown and described a novel method of manufacturing a bulky textured non-woven which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of manufacturing a bulky textured non-woven by the steps of:

(a) producing a spin-bonded non-woven from many individual filaments that have been stretched and deposited in the form of a skein of fibers, (b) pressing and hot bonding the skein into a semifinished non-woven between a pair of rollers, and (c) processing the skein with another pair of rollers, the improvement comprising initially stretching the separate filaments to a range of 50 to 70% of their maximal possible extension just before their breaking point during step (a) and subsequently processing the semifinished non-woven during step (c) between a pair of rollers including a positive roller with elevations distributed over its surface, and a negative roller with the same number depressions distributed over its surface such that the elevations in the positive roller engage the depressions in the negative roller, stretching the non-woven further in the vicinity of the engagement.

2. Method as recited in claim 1, wherein the non-woven is made of a material selected from the group consisting of polyethylene, polypropylene, and polyamide.

3. Method as recited in claim 1, wherein the skein of semifinished non-woven is secured tight against the edges of the rollers during the second stretching.

4. Method as recited in claim 1, wherein the skein of semifinished non-woven is maintained during the second stretching essentially at the temperature prevailing during the first stretching.

5. Method as recited in claim 1, wherein the second stretching in the depressions results in considerable thinning, even to the extent of piercing the semifinished non-woven in the vicinity of the engagement.

* * * * *